(12) United States Patent
Arnold et al.

(10) Patent No.: US 6,601,175 B1
(45) Date of Patent: Jul. 29, 2003

(54) METHOD AND SYSTEM FOR PROVIDING LIMITED-LIFE MACHINE-SPECIFIC PASSWORDS FOR DATA PROCESSING SYSTEMS

(75) Inventors: Todd Weston Arnold, Charlotte, NC (US); David Carroll Challener, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,418

(22) Filed: Mar. 16, 1999

(51) Int. Cl.[7] .................. G06F 15/177; G06F 9/00; G06F 1/24; G06F 11/30; G06F 15/16; H04K 1/00
(52) U.S. Cl. ................ 713/202; 713/1; 713/2; 713/100; 713/200; 713/201; 713/182; 713/183; 713/184; 709/229
(58) Field of Search .................. 713/202, 200, 713/201, 1, 2, 100, 182, 183, 184; 709/229

(56) References Cited

U.S. PATENT DOCUMENTS

| 4,759,062 A | 7/1988 | Traub et al. |
| 4,951,249 A | 8/1990 | McClung et al. |
| 5,091,939 A | 2/1992 | Cole et al. |

(List continued on next page.)

FOREIGN PATENT DOCUMENTS

| JP | 63040963 A | 2/1988 |
| JP | 7129511 A | 5/1995 |

OTHER PUBLICATIONS

Nielsen, Providing Software Protection Capability or a CD–ROM drive, Dec. 1990, Hewlett–Packard Journal, v41, n6, p. 49(5).*
Harold, With Tokens, It's a New Password Every Time, Jun. 11, 1990, ComputerWorld, p. 88.*
Finlay, Don't Wait Until You Get Burned, Mar. 1988, Administrative Management, v49, p. 16.*
Chang, Remote Password Authentication With Smart Cards, May 1991, IEEE Processings, v138, p. 165.*
Webster's II New College Dictionary, Houghton Mifflin Company, 1995, p. 890, 1247.*
Weiss, Sep. 1998, Five Ways To Secure Your Network, Telecommunications Products and Tech, v6, N 9, p68(3).*
IBM Technical Disclosure Bulletin, "Safe Single–Sign–On Protocol With Minimal Password Exposure No–Decryption, and Technology–Adaptivity", vol 38, No. 3, Mar. 1995, pp. 245–248.

Primary Examiner—Gail Hayes
Assistant Examiner—Jenise Jackson
(74) Attorney, Agent, or Firm—Bracewell & Patterson, LLP

(57) ABSTRACT

Features of a data processing system, such as its configuration, are protected utilizing a machine-specific limited-life password. The data processing system includes execution resources for executing a watchdog program, a limited-life value generator, and non-volatile storage that stores a machine-specific value at least partially derived from relatively unique information associated with the data processing system (and preferably also derived from a secret control password). In response to each attempted access to the protected features of the data processing system, the watchdog program generates at least one machine-specific limited-life password from the machine-specific value and a limited-life value generated by the limited-life value generator. The watchdog program allows access to the protected features in response to entry of the machine-specific limited-life password and otherwise denies access. Depending upon implementation, the limited-life value can represent a timestamp that limits the duration that the machine-specific limited-life value is valid or a nonce that limits the number of times that the machine-specific limited-life value can be used.

31 Claims, 6 Drawing Sheets

U.S. PATENT DOCUMENTS

| | | |
|---|---|---|
| 5,226,080 A | 7/1993 | Cole et al. |
| 5,351,295 A * | 9/1994 | Perlman et al. ............ 340/5.27 |
| 5,402,492 A * | 3/1995 | Goodman et al. .......... 713/166 |
| 5,436,972 A | 7/1995 | Fischer |
| 5,535,409 A | 7/1996 | Lavoire et al. |
| 5,611,048 A | 3/1997 | Jacobs et al. |
| 5,694,595 A | 12/1997 | Jacobs et al. |
| 5,699,514 A | 12/1997 | Durinovic-Johri et al. |
| 5,708,777 A | 1/1998 | Sloan et al. |
| 5,751,812 A | 5/1998 | Anderson |
| 5,757,920 A | 5/1998 | Misra et al. |
| 5,768,373 A | 6/1998 | Lohstroh et al. |
| 5,774,650 A | 6/1998 | Chapman et al. |
| 5,784,612 A | 7/1998 | Crane et al. |
| 5,797,030 A | 8/1998 | Hoaby |
| 5,944,821 A * | 8/1999 | Angelo ....................... 713/200 |
| 6,064,736 A * | 5/2000 | Davis et al. .................. 380/30 |
| 6,122,677 A * | 9/2000 | Porterfield ................... 710/10 |
| 6,311,276 B1 * | 10/2001 | Connery et al. ............ 713/201 |
| 6,370,649 B1 * | 4/2002 | Angelo et al. .............. 235/382 |
| 6,397,337 B1 * | 5/2002 | Garrett et al. .............. 709/225 |
| 6,470,454 B1 * | 10/2002 | Challener et al. ........... 713/201 |

* cited by examiner

METHOD AND SYSTEM FOR PROVIDING LIMITED-LIFE MACHINE-SPECIFIC PASSWORDS FOR DATA PROCESSING SYSTEMS

CROSS-REFERENCE TO RELATED APPLICATION

This application is related to the following co-pending applications:

(1) Ser. No. 09/052,554, entitled "Method and Apparatus for Establishing Computer Configuration Protection Passwords for Protecting Computer Configurations," filed Mar. 31, 1998, and incorporated herein by reference; and (2) Ser. No. 09/262,124, entitled "Method and System for Password Protection of a Data Processing System that Permit a User-Selected Password to Be Recovered," filed Mar. 3, 1999, and incorporated herein by reference.

BACKGROUND OF THE INVENTION

1. Technical Field

The present invention relates in general to data processing and in particular to password protection of data processing systems. Still more particularly, the present invention relates to a method and system for providing password protection for data processing systems through the use of limited-use machine-specific passwords.

2. Description of the Related Art

Atypical corporate environment includes a distributed collection of laptop and/or desktop computers that are each assigned to a particular user who is responsible for his or her computer. Even though the individual users are entrusted with "ownership" of their respective machines, the computers are all typically administered by a centralized administrative department. Frequently, the administrative department, prior to distribution of a computer to a user, initializes the computer with hardware settings, software configurations, and other critical parameters that it is desirable for the user not to alter. For this reason, in addition to conventional power-on passwords (POPs), such centrally administered computers can also have secondary administrative password that must be entered into the computer before the critical settings of the computer can be changed. These administrative passwords are given to users only as needed, typically when the administrative department's help desk is assisting a user in rectifying a computer problem.

In order to enhance the security of administrative passwords, it is desirable for the administrative password of each computer in a collection of computers to be unique. However, the administrative password for a computer should not be related to the computer in a manner that permits the administrative password to be easily deduced. The first co-pending application referenced above describes a method and apparatus for establishing administrative passwords that satisfies these requirements by providing computer-specific administrative passwords that cannot easily be deduced from information known about the computer.

Despite the high level of administrative password security provided by the invention described in the first co-pending application referenced above, once a user has been given the administrative password for his computer, the user is thereafter able to reconfigure his computer at will. The present invention recognizes that it would also be desirable and useful to limit the ability of a user to reconfigure his computer once the user is informed of the administrative password for the computer.

SUMMARY OF THE INVENTION

The present invention satisfies the need to permit a user to have limited access to an administrative password that controls reconfiguration of a computer by providing a method and system for enforcing password protection of a computer system that limits reuse of an administrative password.

In accordance with the present invention, features of a data processing system, such as its configuration, are protected utilizing a machine-specific limited-life password. The data processing system includes execution resources for executing a watchdog program, a limited-life value generator, and non-volatile storage that stores a machine-specific value at least partially derived from relatively unique information associated with the data processing system. In response to each attempted access to the protected features of the data processing system, the watchdog program generates at least one machine-specific limited-life password from the machine-specific value and a limited-life value generated by the limited-life value generator. The watchdog program allows access to the protected features in response to entry of a valid machine-specific limited-life password and otherwise denies access. In accordance with the present invention, the limited-life value can represent a timestamp that limits the duration that the machine-specific limited-life value is valid or a nonce that limits the number of times that the machine-specific limited-life value can be used.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
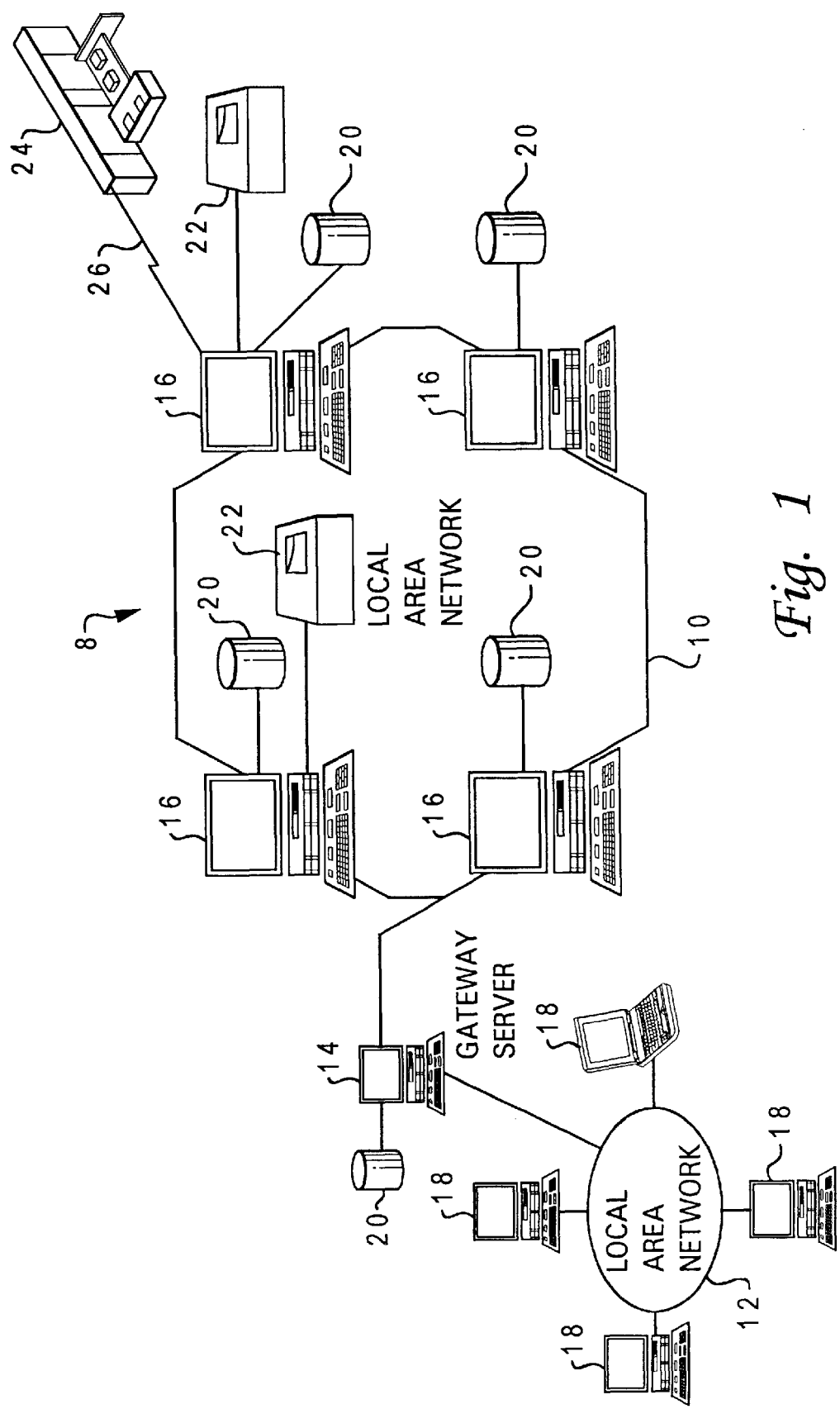
FIG. 1 depicts an enterprise computing environment with which the present invention may advantageously be utilized.

With reference now to the figures and in particular with reference to FIG. 1, there is illustrated an enterprise computing environment 8 with which the present invention may advantageously be utilized. As illustrated, enterprise computing environment 8, which may represent networked computers at a corporate campus (or campuses), contains a plurality of networks, including local area networks (LANs) 10 and 12. LANs 10 and 12 are coupled together through a gateway server 14 and each contain a number of individual computer systems 16 and 18, respectively. In the illustrative embodiment, each of the computer systems 16 and 18 within LANs 10 and 12 is depicted as a desktop or laptop computer; however, those skilled in the art will appreciate that LANs 10 and 32 may alternatively or additionally include a plurality of workstations coupled to a host processor. As is common in data processing networks, each computer system 16 and 18 may have an associated storage device 20 and a printer 22.

Enterprise computing environment 8 further includes a help desk computer 24 coupled to LAN 10 by a communication link 26. Help desk computer 24, which may be manned by one or more help desk operators, executes network administration software that assists the help desk operators to service the computing needs of the users of computers 16 and 18. As will be understood by those skilled in the art, enterprise computing environment 8 additionally includes unillustrated gateways, routers, bridges, and various other network hardware utilized to interconnect the various segments of enterprise computing environment 8.

As will be appreciated from the foregoing, each of computers 16 and 18 typically is assigned to one or more users viewed as "owners" of those computers. Computer users within the corporation may alternatively or additionally be assigned intermittently-networked or stand-alone data processing systems. In order to restrict access to these data processing systems (i.e., computers 16 and 18 of enterprise computing environment 8 as well as any additional commonly administered data processing systems) to only authorized users, each data processing system is preferably password protected with a power-on password (POP). In addition, each data processing system is preferably protected by a relatively unique administrative password or pass phrase required to alter the configuration of the computer set by enterprise administration.

Figure 2:
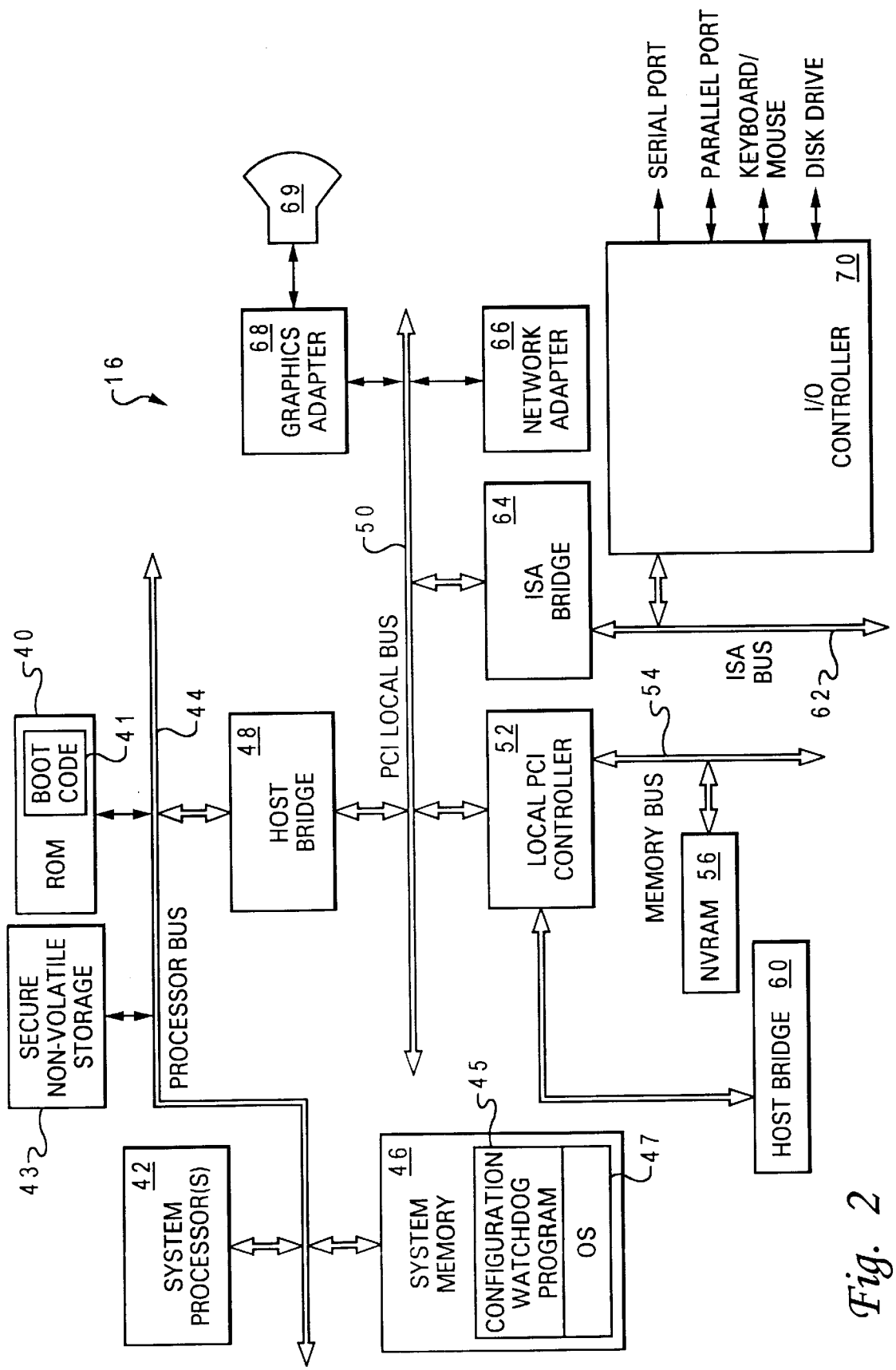
FIG. 2 illustrates a block diagram of an exemplary password-protected computer system in accordance with the present invention.

Referring now to FIG. 2, there is depicted a block diagram of an illustrative embodiment of a computer system 16 within enterprise computing environment 8, having a configuration protected by a machine-specific limited-life administrative password in accordance with the present invention. The illustrative embodiment depicted in FIG. 2 may be a desktop computer system such as an Aptiva®, a laptop computer such a ThinkPad™, or a workstation computer such as the RS/6000®, which are all manufactured by International Business Machines (IBM) Corporation of Armonk, New York; however, as will become apparent from the following description, the present invention is applicable to the password protection of any data processing system.

As shown in FIG. 2, computer system 16 includes at least one system processor 42, which is coupled to a Read-Only Memory (ROM) 40, a secure non-volatile memory 43, and a system memory 46 by a processor bus 44. System processor 42 is a general-purpose processor that executes boot code 41 stored within ROM 40 at power-on and thereafter processes data under the control of an operating system 47 and application software stored in system memory 46. In a preferred embodiment of the present invention, such application software includes configuration watchdog program 45, which, as described in detail below, protects computer system 16 against unauthorized alterations to its configuration. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 16 to LAN 10, and graphics adapter 68, which interlaces computer system 16 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 16 further includes Industry Standard Architecture (ISA) bus 62, which is coupled to PCI local bus 50 by ISA bridge 64. Coupled to ISA bus 62 is an input/output (I/O) controller 70, which controls communication between computer system 16 and attached peripheral devices such as a keyboard, mouse, and disk drive (e.g., storage 14). In addition, I/O controller 70 supports external communication by computer system 16 via serial and parallel ports.

Figure 3:
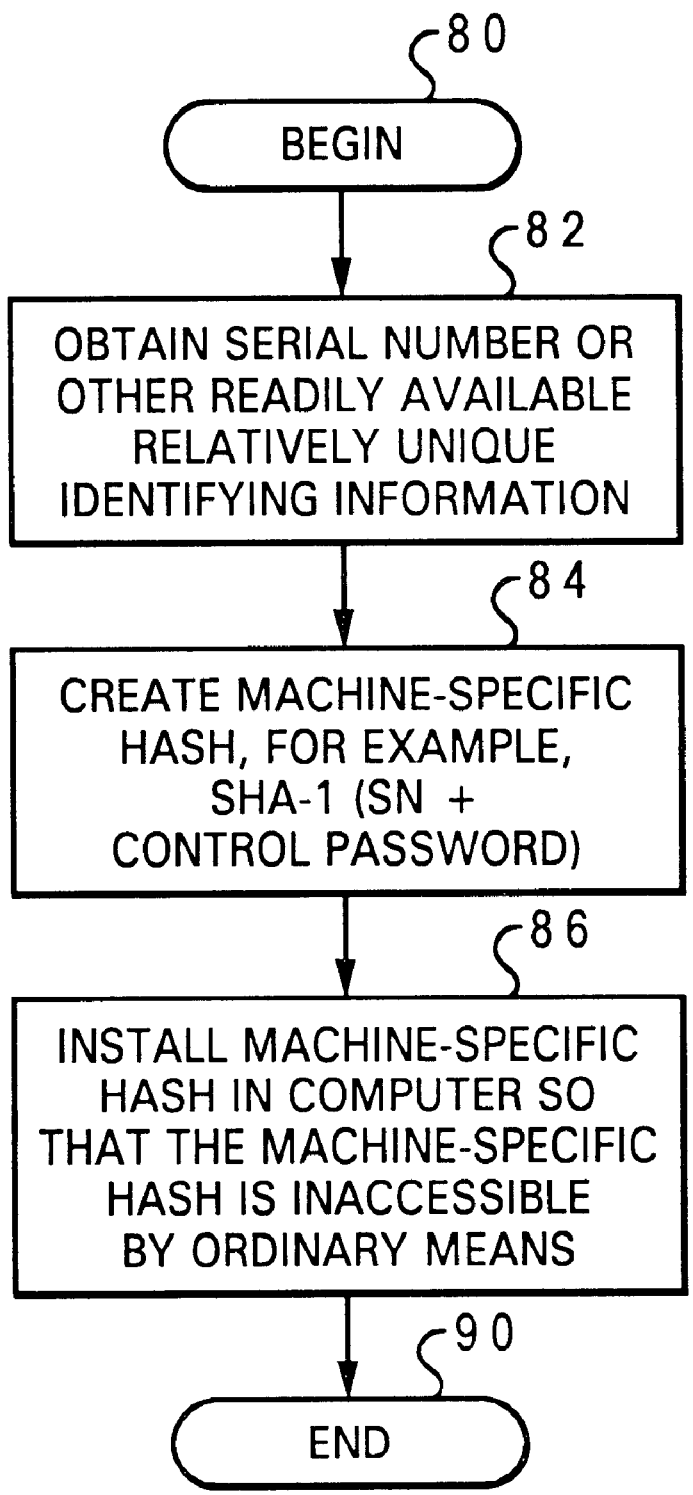
FIG. 3 is a high level logical flowchart of an exemplary method of initializing a password-protected computer system in accordance with the present invention.

With reference now to FIG. 3, there is illustrated a high level logical flowchart of a method of initializing a password-protected computer system, such as computer system 16 of FIG. 2, in accordance with the present invention. The initialization process illustrated in FIG. 2 is typically performed by enterprise administration prior to releasing computer system 16 to a user.

As shown, the process begins at block 80 and thereafter proceeds to block 82, which depicts an enterprise administrator obtaining the serial number or other readily available information that relatively uniquely identifies the computer system 16 to be password protected. Next, at block 84 a machine-specific hash is derived from the serial number or other identifying information of computer system 16 and a control password (or pass phrase) that is unknown to the user and maintained in secret by enterprise administration. In a preferred embodiment, the machine-specific hash is derived by concatenating the serial number and the control password and then hashing the resulting string with a non-reversible hashing algorithm such as SHA-1, MD5, MDC2 or RIPEMD-160. As well-known to those skilled in the art, each of these hashing algorithms accepts as an input an arbitrary-length input string and yields as an output a random-appearing fixed-length output string that, for a given hashing algorithm, is the same for identical inputs. It is also important to note that although the input string for the hashing algorithm can be formed by concatenating the identifying information and the control password as described above, any other consistent combination of the identifying information and control password to form a hash input string would be acceptable, including exclusive OR reverse concatenation, etc. In addition, additional components can be combined to form the input string, as long as such components are consistently utilized.

As shown at block 86, the network administrator then stores the machine-specific hash in a secure non-volatile storage area of computer system 16 that is not accessible to the user by ordinary means. The security of the machine-specific hash maybe protected, for example, by an initialization password or by storing the machine-specific hash in a write-only location accessible only to computer system 16 such as secure non-volatile storage 43, as is well-known in cryptography. The initialization process then terminates at block 90.

Once a computer system has been intialized by enterprise administration in the manner shown in FIG. 3, the user must have access to the machine-specific administrative password of the computer system to unlock its sensitive configuration processes and modify its configuration. In order to prevent the user from being able to reconfigure the computer system at will after learning the administrative password, the useful lifetime of the administrative password is preferably limited in one of two ways—either by restricting the validity of the administrative password to a predetermined time period or a predetermined number of uses (or sessions). Implementations of these two schemes are described below with reference to FIGS. 4A and 4B and FIGS. 5A and 5B, respectively.

Figures 4A, 4B:
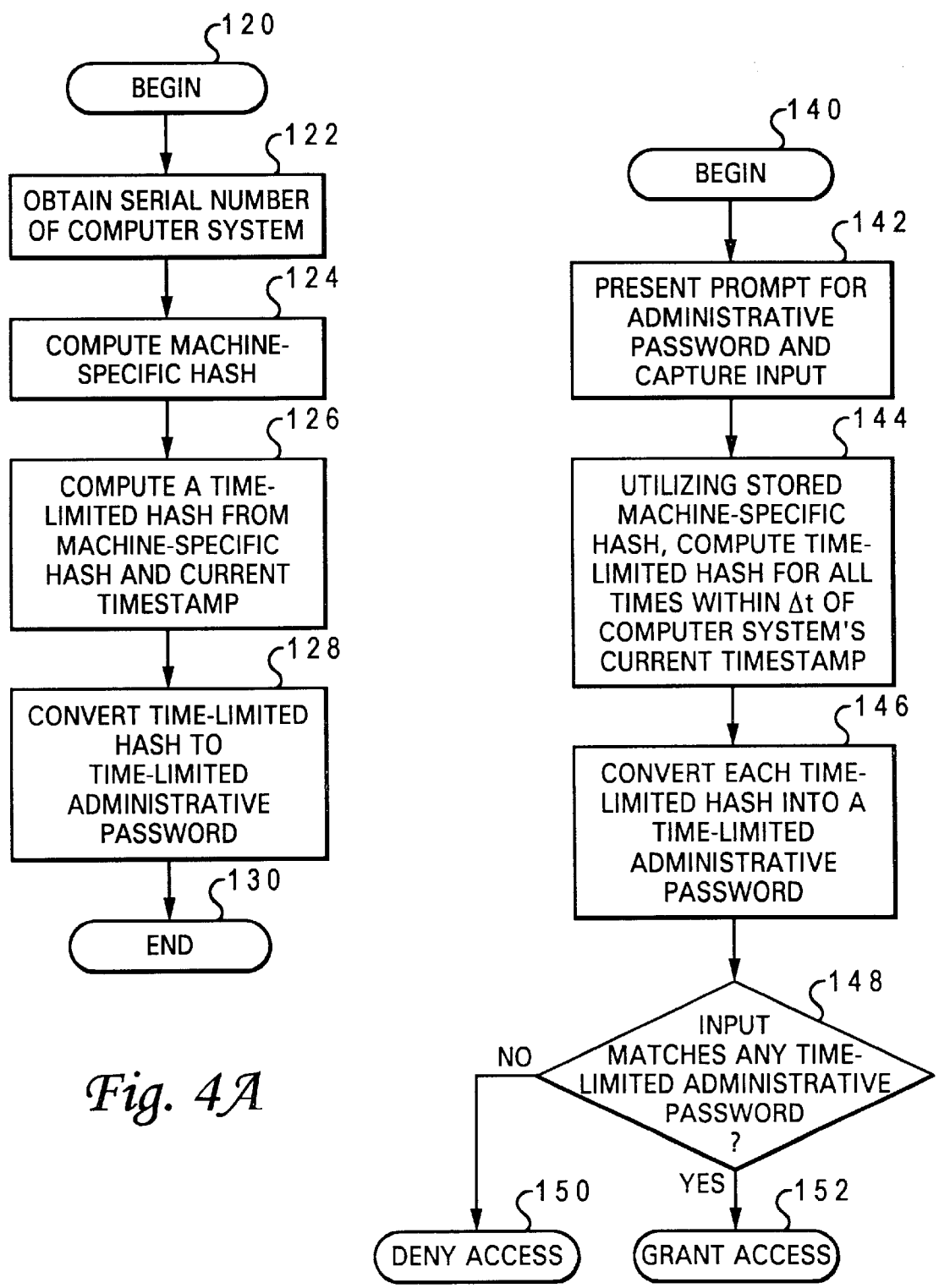
FIG. 4A is a high level logical flowchart of an exemplary method of producing a time-limited administrative password for a computer system in accordance with the present invention.
FIG. 4B is a high level logical flowchart of an exemplary method of protecting a computer system with a time-limited administrative password in accordance with the present invention.

Referring first to FIG. 4A, there is depicted a high level logical flowchart of an exemplary method by which enterprise administration can derive a time-limited administrative password for a computer system in accordance with the present invention. This method assumes that both enterprise administration (e.g., help desk computer 24) and the computer system in question utilize continuously running system clocks that are fairly closely synchronized at all times within a tolerance $\Delta T$. In more secure environments, it is preferable if the clock within the computer system cannot be reset by the user; in less secure environments, the computer system's standard integrated clock can be utilized. The increment in which the clocks keep time is implementation dependent, but should be consistent in order to avoid having to convert between differing time scales. Advantageously, the method shown in FIG. 4A does not require that enterprise administration maintain a list of administrative passwords for each computer system under its control, but instead permits a limited-life administrative password for a computer system to be derived on an as-needed basis (i.e., when a configuration update is needed). Depending upon how support is provided in the enterprise, the method may be performed by humans at a remote help desk computer 24, by an on-site service engineer equipped with a portable computer or personal digital assistant (PDA), or over a computer network by automation.

As illustrated, the process begins at block 120 and thereafter proceeds to block 122, which depicts enterprise administration obtaining the serial number or other relatively unique identifying information of the computer system. This step is identical to block 82 of FIG. 3, and may entail the user providing the serial number over the phone or network or an on-site service engineer electronically or visually reading the serial number from the computer system. Next, at block 124, the machine-specific hash of the computer system is computed (e.g., by help desk computer 24) from the serial number (or other identifying information) and the known control password, as discussed above with respect to block 84 of FIG. 3. The process then proceeds to block 126, which illustrates computing a time-limited hash from the machine-specific hash and the current timestamp of the computer system utilized by enterprise administration, which preferably generates timestamps including both a date (e.g., mm/dd/yyyy) and time. The time-limited hash can be obtained, for example, by concatenating the timestamp and the machine-specific hash to form an input string and then hashing the input string with SHA-1 or some other non-reversible hashing algorithm. As before, the manner in which the hash input string is formed and the hashing algorithm employed are implementation dependent. The time-limited hash computed at block 126 is then converted into a time-limited administrative password of reasonable length that can be input from the computer keyboard. One example of a method that can be utilized to convert the time-limited hash into a time-limited administrative password is described below with reference to FIG. 6. Following block 128, the process shown in FIG. 4A terminates at block 130, and the time-limited administrative password is supplied to the user or to the user's computer system via a network or a portable storage medium.

With reference now to FIG. 4B, there is illustrated a high level logical flowchart of an exemplary method by which a computer system enforces password-protection of its configuration using a time-limited administrative password in accordance with the present invention. The process, which is preferably implemented as a configuration "watchdog" program executed by the computer system, begins at block 140 and thereafter proceeds to block 142, which illustrates the computer system presenting a prompt for an administrative password and capturing the inputs provided in response to the prompt. The prompt may be presented, for example, in a dialog box format in response to the user requesting a modification to the configuration of the computer system. Of course, such a prompt may not be necessary if the time-limited administrative password is supplied directly to the computer system via a network or a portable storage medium.

Next, at block 144 the computer system computes, from its prestored machine-specific hash, the time-limited hash for all time increments within $\Delta T$ of the current timestamp as measured by its clock. The computation of the time-limited hashes is performed as described above with respect to block 126 of FIG. 4A. The time-limited hashes computed at block 144 are then converted into time-limited administrative passwords at block 146 utilizing, for example, the method shown in FIG. 6. Thereafter, the input entered by the user in response to the prompt displayed at block 142 is authenticated by comparison to the time-limited administrative passwords produced at block 146. If the input matches one of the time-limited administrative passwords, access to the configuration of the computer system for purposes of modifying the configuration is granted, as shown at block 152. Otherwise, access to the configuration of the computer system is denied, as depicted at block 150.

The limited-time password protection scheme depicted in FIGS. 4A and 4B permits a tolerance $\Delta T$ between the timestamps generated by the target computer system's clock and the clock utilized by enterprise administration for several reasons. First, permitting this tolerance obviates the need to closely synchronize the two clocks. Second, the user or service engineer is permitted a reasonable amount of time to enter the limited-time administrative password before it becomes invalid. Third, the limited-time administrative password can be designed to be valid for long enough for the configuration modification to be completed, which may entail rebooting the computer system and reentering the administrative password. It should also be noted that the tolerance following the enterprise administration timestamp can advantageously be implemented to be larger than the tolerance preceding the enterprise administration timestamp because the tolerance window preceding the timestamp need only be large enough to accommodate the mis-synchronization of the clocks.

Figure 5A:
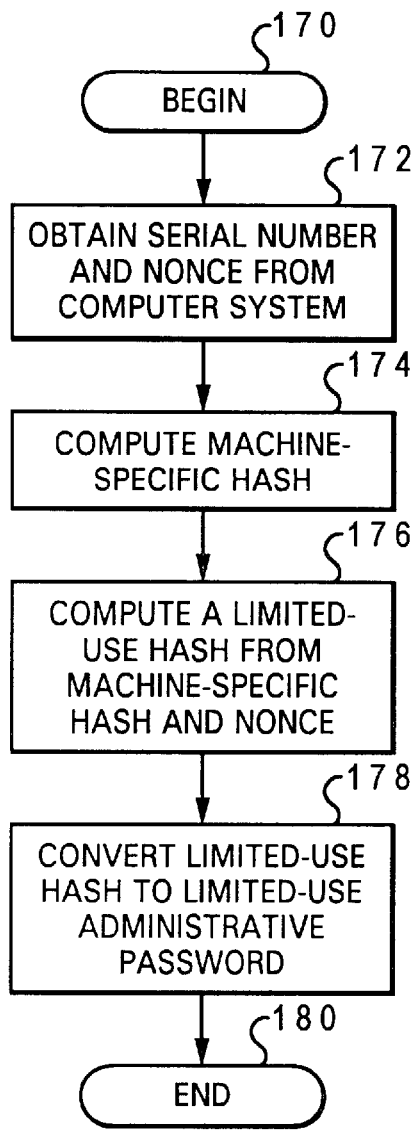
FIG. 5A is a high level logical flowchart of an exemplary method of producing a limited-use administrative password for a computer system in accordance with the present invention.

Referring now to FIG. 5A, there is depicted is a high level logical flowchart of an exemplary method by which enterprise administration can produce a limited-use administrative password for a computer system in accordance with the present invention. This method does not utilize clocks as in the above-described method, but instead assumes that the target computer system is capable of generating a nonce, which is defined herein as a value having a negligible probability of being repeated over the useful lifetime of the computer system. The nonce can be generated by software or hardware utilizing, for example, a monotonically-increasing counter, a gray-scale counter, or a pseudo-random number generator. The method shown in FIG. 5A again has the advantage of not requiring enterprise administration to maintain a list of administrative passwords for each computer system under its control, but instead permitting a limited-life administrative password to be derived for particular computer systems on an as-needed basis. As above, the method may be performed by humans and computers at a remote help desk computer 24, by an on-site service engineer equipped with a portable computer or personal digital assistant (PDA), or over a computer network by automation, depending upon how support is provided in the enterprise.

As depicted, the process begins at block 170 and thereafter proceeds to block 172, which depicts enterprise administration obtaining the serial number or other relatively unique identifying information of the target computer system, as discussed above with respect to block 122 of FIG. 4A. In addition, a nonce generated by the target computer system is supplied to enterprise administration. Next, at block 174, the machine-specific hash of the computer system is computed from the serial number (or other identifying information) and the known control password, as discussed above with respect to block 84 of FIG. 3. The process then proceeds to block 176, which illustrates computing a limited-use hash from 11 the machine-specific hash and the nonce. The limited-use hash can be obtained, for example, by concatenating the nonce and the machine-specific hash to form an input string and then hashing the input string with SHA-1 or some other non-reversible hashing algorithm. As before, the manner in which the hash input string is obtained and the hashing algorithm that is employed are implementation dependent. The limited-use hash computed at block 176 is then converted into a limited-use administrative password of reasonable length that can be input from the computer keyboard according to the method shown in FIG. 6. Following block 178, the process shown in FIG. 5A terminates at block 180, and the limited-use administrative password is supplied to the user.

Figure 5B:
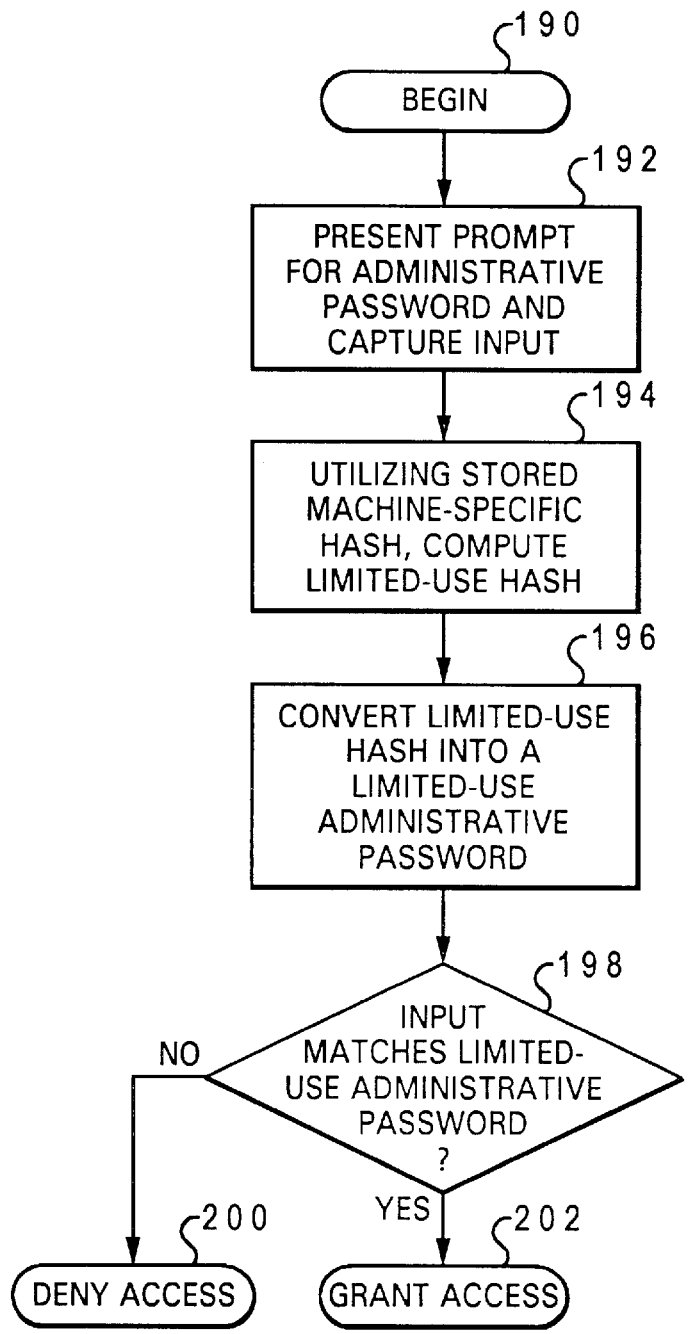
FIG. 5B is a high level logical flowchart of an exemplary method of protecting a computer system with a limited-use administrative password in accordance with the present invention.

With reference now to FIG. 5B, there is illustrated a high level logical flowchart of an exemplary method by which a computer system enforces password-protection of its configuration using a limited-use administrative password in accordance with the present invention. Like the process shown in FIG. 4B, the process depicted in FIG. 5B would typically be implemented as a configuration "watchdog" program triggered in response to a user attempting to modify the configuration of the computer system. As shown, the process begins at block 190 and thereafter proceeds to block 192, which illustrates the computer system presenting a prompt for an administrative password and capturing the inputs provided in response to the prompt. Next, at block 194, the computer system computes a limited-use hash from its prestored machine-specific hash and the same nonce supplied at block 172 of FIG. 5A. The computation of the limited-use hash is performed as described above with respect to block 176 of FIG. 5A. The limited-use hash computed at block 194 is then converted into a limited-use administrative password at block 196 utilizing, for example, the method shown in FIG. 6. Thereafter, the input entered by the user in response to the prompt displayed at block 192 is authenticated by comparison to the limited-use administrative password produced at block 196. If the input matches the limited-use administrative password, access to the configuration of the computer system for purposes of modifying the configuration is granted, as shown at block 202. Otherwise, access to the configuration of the computer system is denied, as depicted at block 200.

The number of uses for which a limited-use administrative password is valid according to the method illustrated in FIGS. 5A and 5B depends upon the conditions under which the target computer is designed to generate a new nonce. For example, the computer system could automatically update the nonce each time a valid administrative password is entered or alternatively each time the computer system is powered on (i.e., a hard boot). Updating the nonce in response to hard boots may be preferable in that doing so permits the configuration of the computer system to be unlocked multiple times during a single session with a single limited-use password, meaning that a new limited-use administrative password need not be generated if the computer system is rebooted during the reconfiguration process.

A key aspect to the exemplary configuration password-protection schemes shown in FIGS. 4A and 4B and FIGS. 5A and 5B is the authentication of an input received by the computer system by reference to a limited-life value generated within the computer system. Although the exemplary methods shown in FIGS. 4B and 5B accomplish this authentication by comparing an input with one or more limited-life administrative passwords generated by the computer system, alternative methods of input authentication are possible in accordance with the present invention. For example, the hash generated by enterprise administration can be input into the target computer system and directly compared to the one or more hashes generated by the target computer system. Alternatively, a putative limited-life administrative password entered into the target computer system can, depending upon the hash-to-password conversion algorithm, be converted back into a hash and compared to the limited-life hash(es) generated by the target computer system.

Figure 6:
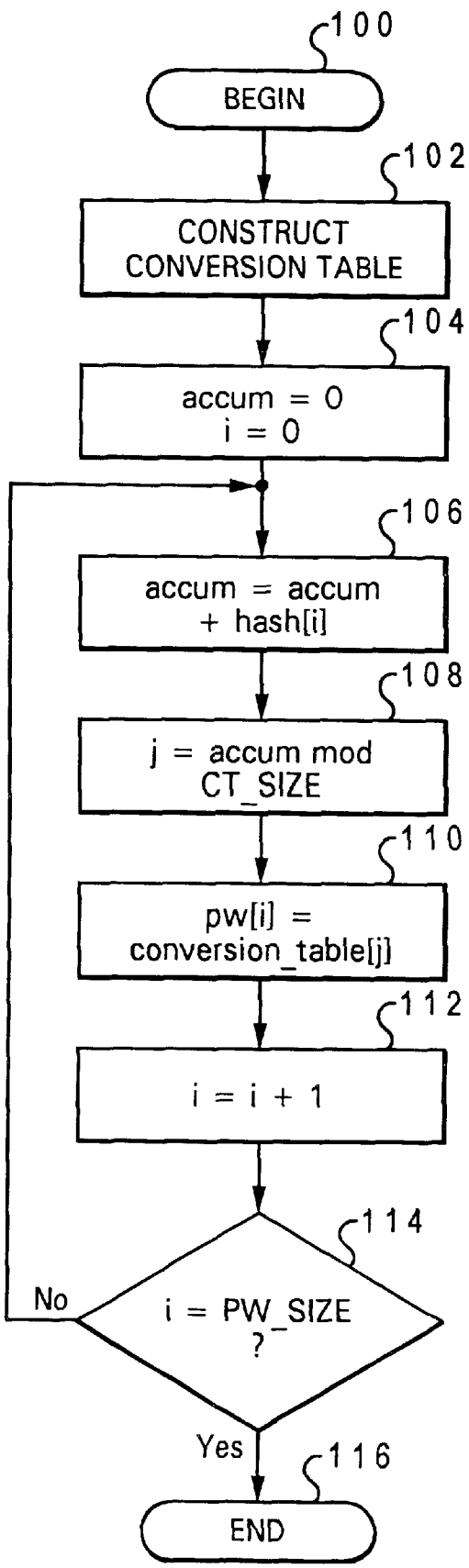
FIG. 6 is a high level logical flowchart of an exemplary method for converting a hash into an administrative password in accordance with the present invention.

Referring now to FIG. 6, there is depicted a high level logical flowchart of an exemplary method of converting a hash into a password in accordance with the present invention. As illustrated, the process begins at block 100 and thereafter proceeds to block 102, which depicts selecting or constructing a conversion table such as: 0, 1, 2, 3, 4, 5, 6, 7, 8, 9, A, B, C, D, E, F, G, H, I, J, K, L, M, N, 0, P, Q, R, S, T, U, V, W, X, Y, Z. In this exemplary conversion table, each alphanumeric character represents one byte of data, yielding a total conversion table size (CT_SIZE) of 36 bytes; other conversion tables having differing sizes and contents may alternatively be used. As depicted at block 104, an accumulator (accum) and a counter (i) are also initialized to zero.

The process then proceeds from block 104 to block 106, which illustrates setting the value of the accumulator to the sum of the previous accumulator value and the byte of the machine-specific hash indexed by the counter. Next, at block 108, a conversion table index (j) is determined by computing the remainder obtained when the accumulator is divided by the CT_SIZE. The byte value within the conversion table identified by the conversion table index is then assigned to the password byte indexed by counter i, as illustrated at block 110. The value of counter i is then incremented and compared to a fixed password size (PW_SIZE) at blocks 112 and 114. If the predetermined password size has not yet been obtained, the process repeats blocks 106–114. If, however, an administrative password of the predetermined length has been obtained, the conversion process depicted in FIG. 6 terminates at block 116.

To further illustrate the principles of the present invention, an exemplary implementation of the limited-use password protection scheme outlined in FIGS. 5A and 5B will now be given. It will be assumed that the control password is selected to be h'0123456789ABCDEF' and that the serial number of the target computer system is "78-AAKP7," which is represented in hexadecimal notation as h'37382D41414B5037'. Pre-processing of the hexadecimal representation of the serial number preferably capitalizes all lower case letters (if any) and removes non-alphanumeric characters. Thus, the dash is omitted from the serial number, leaving the hexadecimal string h'373841414B5037'. The control password and serial number are then concatenated to form the hash input string h'0123456789 ABCDEF373841414B5037', which is 15 bytes is length. This input string can then be hashed utilizing the SHA-1 algorithm to obtain the machine-specific hash h'2BEC36EBBEEAA2E0EDE951D76CFB188A584A41BD' which is stored within the computer system when initialized by enterprise administration.

Thereafter, when the user attempts to update the configuration of the computer system, the computer system will provide the user with a nonce such as h'E349AF9C55B2CCA7', which is 8 bytes in length. This nonce and the serial number of the computer system are then supplied to enterprise administration. As described above, enterprise administration computes the machine-specific hash of the computer system from the serial number and the control password. The machine-specific hash and the nonce can then be concatenated to form the following 28-byte hash input string for the SHA-1 algorithm: h'2BEC36EBBEEAA2E0EDE951D76CFB188 A584A41BDE349AF9C55B2CCA7'. Hashing this input string with the SHA-1 algorithm yields the 20-byte limited-use hash h'A4004BD5E702258E EBD7D00751CB4AFE6F2947F4'. When converted according to the method of FIG. 6, this limited-use hash yields the limited-use administrative password "KKNKZ12". When this administrative password is entered into the computer system, the computer system authenticates the administrative password by reference to a similarly computed administrative password and then grants the user access to the protected configuration features of the computer system.

As has been described, the present invention provides an improved method and system for implementing password protection for a data processing resource such as a computer system. According to the present invention, a limited-life administrative password having either a is limited validity duration or a limited valid number of uses can be generated on an as-needed basis by the computer support organization to unlock the configuration processes of a computer system. Even if a user is supplied the administrative password to perform a configuration update, the computer support organization retains ultimate control over modifications to the configuration of the computer system since the administrative password has a limited life and therefore cannot be re-used by the user at will.

The present invention has a number of additional advantageous properties. First, the user cannot derive the control password from the administrative password. Second, because the machine-specific hash is stored within each computer system such that it cannot be accessed by a user, users cannot independently compute valid administrative passwords for their machines. Third, the administrative passwords are machine-specific by virtue of their derivation from computer serial numbers (or other relatively unique identifying information) and are domain-specific by virtue of their derivation from an arbitrarily-selected control password. Fourth, the present invention does not require the use of an export-controlled encryption algorithm.

While the invention has been particularly shown and described with reference to an illustrative embodiment, it will be understood by those skilled in the art that various changes in form and detail may be made therein without departing from the spirit and scope of the invention. For example, although the present invention has been described with respect to an illustrative embodiment in which password protection is provided for computer systems in an enterprise, it should be understood that the present invention is equally applicable to other data processing systems such as PDAs, set-top boxes, network routers and other network equipment, and remotely-located encryption devices. In addition, although aspects of the present invention have been described with respect to one or more computer systems executing software that directs the functions of the present invention, it should be understood that present invention may alternatively be implemented as a computer program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A method of protecting features by a data processing system utilizing a machine-specific limited-life password, said method comprising:

within non-volatile storage of a data processing system, persistently storing a persistent machine-specific hash value at least partially derived by hashing a combination of fixed information associated with said data processing system and a control password unavailable to a user of said data processing system;

in response to each attempted access to the protected features, said data processing system generating at least one machine-specific limited-life password from said persistent machine-specific hash value and a limited-life value generated within said data processing system; and said data processing system allowing access to said protected features in response to entry of said machine-specific limited-life password and denying access otherwise.

2. The method of claim 1, and further comprising deriving said machine-specific hash value from the control password and said fixed information utilizing a non-reversible hashing algorithm.

3. The method of claim 1, wherein said fixed information comprises a serial number of said data processing system.

4. The method of claim 1, and further comprising maintaining a continuously running clock within said data processing system, wherein said limited-life value is a timestamp of said clock.

5. The method of claim 4, wherein generating at least one machine-specific limited-life password comprises:

in response to a particular attempted access, generating a plurality of machine-specific limited-life passwords that are each derived from one of a plurality of timestamps within a selected interval of the particular attempted access.

6. The method of claim 1, and further comprising generating a nonce within said data processing system, wherein said nonce is said limited-life value.

7. The method of claim 6, wherein generating a nonce comprises generating a nonce in response to each attempted access to protected features of said data processing system.

8. The method of claim 6, wherein generating a nonce comprises generating a nonce in response to each cold boot of said data processing system.

9. The method of claim 1, wherein allowing access to said protected features comprises allowing access to a configuration of said data processing system such that said configuration can be modified.

10. The method of claim 1, wherein generating at least one machine-specific limited-life password comprises:
hashing an input string formed from said machine-specific hash value and said limited-life value to obtain a limited-life hash; and
converting said limited-life hash into said machine-specific limited-life password.

11. A data processing system, comprising:
non-volatile storage that persistently stores a persistent machine-specific hash value at least partially derived by hashing a combination of fixed information associated with said data processing system and a control password unavailable to a user of the data processing system;
a limited-life value generator,
execution resources; and
a watchdog program executable by said execution resources that, in response to each attempted access to protected features, generates at least one machine-specific limited-life password from said persistent machine-specific hash value and a limited-life value generated by said limited-life value generator and that allows access to said protected features only in response to entry of said machine-specific limited-life password.

12. The data processing system of claim 11, wherein said machine-specific hash value is derived from said control password and said fixed information utilizing a non-reversible hashing algorithm.

13. The data processing system of claim 11, wherein said fixed information comprises a serial number of said data processing system.

14. The data processing system of claim 11, said limited-life value generator comprising a continuously running clock, wherein said limited-life value is a timestamp of said clock.

15. The data processing system of claim 14, wherein said watchdog program, responsive to a particular attempted access, generates a plurality of machine-specific limited-life passwords that are each derived from one of a plurality of timestamps within a selected interval of the particular attempted access.

16. The data processing system of claim 11, wherein said limited-life value generator comprises a nonce generator and said limited-life value is a nonce.

17. The data processing system of claim 16, wherein said nonce generator generates a nonce in response to each attempted access to protected features of said data processing system.

18. The data processing system of claim 16, wherein said nonce generator generates a nonce in response to each cold boot of said data processing system.

19. The data processing system of claim 11, and further comprising said protected features, wherein said protected features include a configuration of said data processing system.

20. The data processing system of claim 11, wherein said watchdog program generates said at least one machine-specific limited-life password by hashing an input string formed from said machine-specific hash value and said limited-life value to obtain a limited-life hash and then converting said limited-life hash into said machine-specific limited-life password.

21. A program product, comprising:
a data processing system usable medium; and
password protection software embodied within said data processing system usable medium, wherein said password protection software includes:
initialization software that derives a persistent machine-specific hash value by hashing a combination of a control password unavailable to a user of the data processing system and fixed information associated with said data processing system; and
a watchdog program that, in response to each attempted access to protected features, generates at least one machine-specific limited-life password from the persistent machine-specific hash value and a limited-life value generated by a limited-life value generator within the data processing system, wherein said watchdog program allows access to said protected features only in response to entry of said machine-specific limited-life password.

22. The program product of claim 21, wherein said initialization software derives said machine-specific hash value utilizing a non-reversible hashing algorithm.

23. The program product of claim 21, wherein said fixed information comprises a serial number of the data processing system.

24. The program product of claim 21, wherein said limited-life value is a timestamp of a clock within the data processing system.

25. The program product of claim 24, wherein said watchdog program, responsive to a particular attempted access, generates a plurality of machine-specific limited-life passwords that are each derived from one of a plurality of timestamps within a selected interval of said particular attempted access.

26. The program product of claim 21, wherein said limited-life value is a nonce.

27. The program product of claim 21, wherein said protected features include a configuration of the data processing system.

28. The program product of claim 21, wherein said watchdog program generates said at least one machine-specific limited-life password by hashing an input string formed from said machine-specific hash value and said limited-life value to obtain a limited-life hash and then converting said limited-life hash into said machine-specific limited-life password.

29. The method of claim 1, and further comprising entering an attempted password into said data processing system in unencrypted form to gain access to said protected features.

30. The data processing system of claim 11, wherein said watchdog program allows access to said protected features only in response to a match between an unencrypted attempted password and said machine-specific limited-life password.

31. The program product of claim 21, wherein said watchdog program allows access to said protected features only in response to a match between an unencrypted attempted password and said machine-specific limited-life password.

* * * * *